United States Patent
Bowman et al.

(10) Patent No.: US 12,271,424 B2
(45) Date of Patent: Apr. 8, 2025

(54) EPHEMERAL GRAPH DATABASE

(71) Applicant: The Boeing Company, Arlington, VA (US)

(72) Inventors: David Richard Bowman, Charleston, SC (US); Mary Kay Van De Vanter, Redmond, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/456,822

(22) Filed: Aug. 28, 2023

(65) Prior Publication Data

US 2025/0077578 A1 Mar. 6, 2025

(51) Int. Cl.
*G06F 16/901* (2019.01)
*G06F 16/22* (2019.01)

(52) U.S. Cl.
CPC ...... *G06F 16/9024* (2019.01); *G06F 16/2219* (2019.01)

(58) Field of Classification Search
CPC ............. G06F 16/9024; G06F 16/2219; G06F 16/9027
USPC ....................................................... 707/798
See application file for complete search history.

(56) References Cited

U.S. PATENT DOCUMENTS

| | | | | |
|---|---|---|---|---|
| 8,869,020 B2 * | 10/2014 | Daga | ..................... | G06F 16/248 |
| | | | | 715/212 |
| 9,477,779 B2 | 10/2016 | Webber et al. | | |
| 10,055,410 B1 * | 8/2018 | Dubbels | ................ | G06F 40/237 |
| 10,152,560 B2 | 12/2018 | Potiagalov et al. | | |

(Continued)

FOREIGN PATENT DOCUMENTS

| | | | | |
|---|---|---|---|---|
| CN | 112699134 A | * | 4/2021 | |
| CN | 113239063 A | * | 8/2021 | ............. G06F 16/23 |

(Continued)

OTHER PUBLICATIONS

Schafer et al., "Graph4Med: a web application and a graph database for visualizing and analyzing medical databases", BMC Bioinformatics, (2022) 23:537, 22 pages. (Year: 2022).*

(Continued)

*Primary Examiner* — Phuong Thao Cao
(74) *Attorney, Agent, or Firm* — Alleman Hall & Tuttle LLP (57) ABSTRACT

A server computing device including one or more server memory devices storing a relational database. The server computing device further includes one or more server processing devices configured to receive an ephemeral graph database request. The ephemeral graph database request indicates a selection of data stored in the relational database. The processing devices generate an ephemeral graph database that encodes the selected data in a graph structure and store the ephemeral graph database in binary large object (BLOB) storage at the one or more memory devices. The processing devices receive instructions to apply a graph analytics algorithm at the ephemeral graph database. The processing devices read the ephemeral graph database from the BLOB storage and apply the graph analytics algorithm (Continued)

to the ephemeral graph database to generate a graph analytics result. The processing devices output the graph analytics result and delete the ephemeral graph database from the BLOB storage.

20 Claims, 9 Drawing Sheets

(56) References Cited

U.S. PATENT DOCUMENTS

| | | | |
|---|---|---|---|
| 10,776,965 B2 | 9/2020 | Stetson et al. | |
| 11,636,111 B1* | 4/2023 | Tong | G06F 16/21 707/769 |
| 2016/0019228 A1 | 1/2016 | Hong et al. | |
| 2016/0070759 A1* | 3/2016 | Huang | G06F 16/2458 707/769 |
| 2016/0125094 A1* | 5/2016 | Li | G06F 16/9024 707/741 |
| 2017/0053294 A1* | 2/2017 | Yang | G06Q 20/4016 |
| 2017/0177681 A1* | 6/2017 | Potiagalov | G06F 16/26 |
| 2018/0129686 A1* | 5/2018 | Vaishnav | G06F 16/9024 |
| 2019/0332696 A1* | 10/2019 | Chen | G06F 16/2471 |
| 2019/0332956 A1* | 10/2019 | Ankisettipalli | H04L 51/18 |
| 2020/0201820 A1* | 6/2020 | Lutz | H04N 21/26283 |
| 2020/0409931 A1* | 12/2020 | Zang | G06F 16/2365 |
| 2021/0158176 A1* | 5/2021 | Wan | G06F 18/22 |
| 2021/0256063 A1* | 8/2021 | Kasperovics | G06F 16/9024 |
| 2021/0334312 A1* | 10/2021 | Neo | H04L 41/145 |
| 2021/0390090 A1* | 12/2021 | Eberlein | G06F 16/28 |
| 2022/0343780 A1* | 10/2022 | Miller | G08G 5/006 |
| 2024/0346421 A1* | 10/2024 | Eberlein | G06Q 10/0637 |

FOREIGN PATENT DOCUMENTS

| | | | | |
|---|---|---|---|---|
| DE | 102019135542 A1 | * | 6/2021 | |
| JP | 2022160839 A | * | 10/2022 | |
| JP | 2023041635 A | * | 3/2023 | G06F 16/2474 |
| WO | WO-2021120000 A1 | * | 6/2021 | G06F 16/2358 |

OTHER PUBLICATIONS

Unal et al., "Migration of Data from Relational Database to Graph Database", Proceedings of the 8th International Conference on Information Systems and Technologies (ICIST '18), Mar. 16-18, 2018, Article No. 6, pp. 1-5. (Year: 2018).*

Sholeh et al., "Migrating Data from a Relational Database to a Graph Database in the Management System of Cooperation Archives", AIP Conference Proceedings, vol. 2491, Issue 1, Jun. 14, 2023, 040027: pp. 1-10. (Year: 2023).*

European Patent Office, Extended European Search Report Issued in Application No. 24190740.1, Jan. 23, 2025, Germany, 12 pages.

"Back up an offline database," Neo4j, Available Online at https://web.archive.org/web/20230324032606/https://neo4j.com/docs/operations-manual/current/backup-restore/offline-backup/, Mar. 24, 2023, 3 pages.

"Restore a database backup," Neo4j, Available Online at https://web.archive.org/web/20230324162423/https://neo4j.com/docs/operations-manual/current/backup-restore/restore-backup/, Mar. 14, 2023, 6 pages.

* cited by examiner

EPHEMERAL GRAPH DATABASE

FIELD

This application is related generally to database management and more specifically to computing graph analytics results from data stored in databases.

BACKGROUND

A relational database is a type of database in which data elements that are related to each other are stored in a manner that reflects the relationships between the data elements. A database in which the data elements are organized into rows and columns is one example of a relational database. More complex relationships between the data elements and sets thereof are also expressible using relational databases.

A relational database can be represented as having a graph structure. In this graph structure, data elements or sets of data elements are represented as nodes of a graph, and relationships between those elements or sets are represented as edges of the graph. When a relational database is represented using a graph structure, techniques from graph theory can be used to perform analytics on the relational database. Thus, a user can extract insights related to the graph structure of the relationships between the data elements.

SUMMARY

According to one aspect of the present disclosure, a server computing device is provided, including one or more server memory devices storing a relational database. The server computing device further includes one or more server processing devices configured to receive an ephemeral graph database request via a database application-programming interface (API). The ephemeral graph database request indicates a selection of data stored in the relational database for inclusion in an ephemeral graph database. The one or more server processing devices are further configured to generate the ephemeral graph database. The ephemeral graph database encodes the selected data in a graph structure. The one or more server processing devices are further configured to store the ephemeral graph database in binary large object (BLOB) storage at the one or more server memory devices. The one or more server processing devices are further configured to receive, via the database API, instructions to apply a graph analytics algorithm at the ephemeral graph database, and, in response to receiving the instructions to apply the graph analytics algorithm, read the ephemeral graph database from the BLOB storage. The one or more server processing devices are further configured to apply the graph analytics algorithm to the ephemeral graph database to generate a graph analytics result. The one or more server processing devices are further configured to output the graph analytics result. The one or more server processing devices are further configured to delete the ephemeral graph database from the BLOB storage.

DETAILED DESCRIPTION

In existing relational database management systems (RDBMSs), performing graph analytics on a stored database includes replicating the data stored in a relational database. This replicated data is stored in persistent storage while graph analytics are performed. However, storing the replicated data in persistent storage when performing graph analytics frequently requires large amounts of storage space. Furthermore, in examples in which graph analytics are performed repeatedly, storing the replicated data in persistent storage frequently occurs additional costs associated with maintaining and updating the copy of the database. The frequency of data quality errors also increases when the relational database is replicated, as do costs associated with correcting those errors.

In order to address the above challenges with performing graph data analytics at relational databases, an ephemeral graph database is provided. This ephemeral graph database is stored for a limited duration and is stored in binary large object (BLOB) storage rather than in the RDBMS. Accordingly, the ephemeral graph database is generated with reduced overhead. This reduced overhead allows the user to generate an ephemeral graph database specifically to perform a graph analytics algorithm, with the ephemeral graph database being deleted the graph analytics algorithm finishes running.

Figure 1:
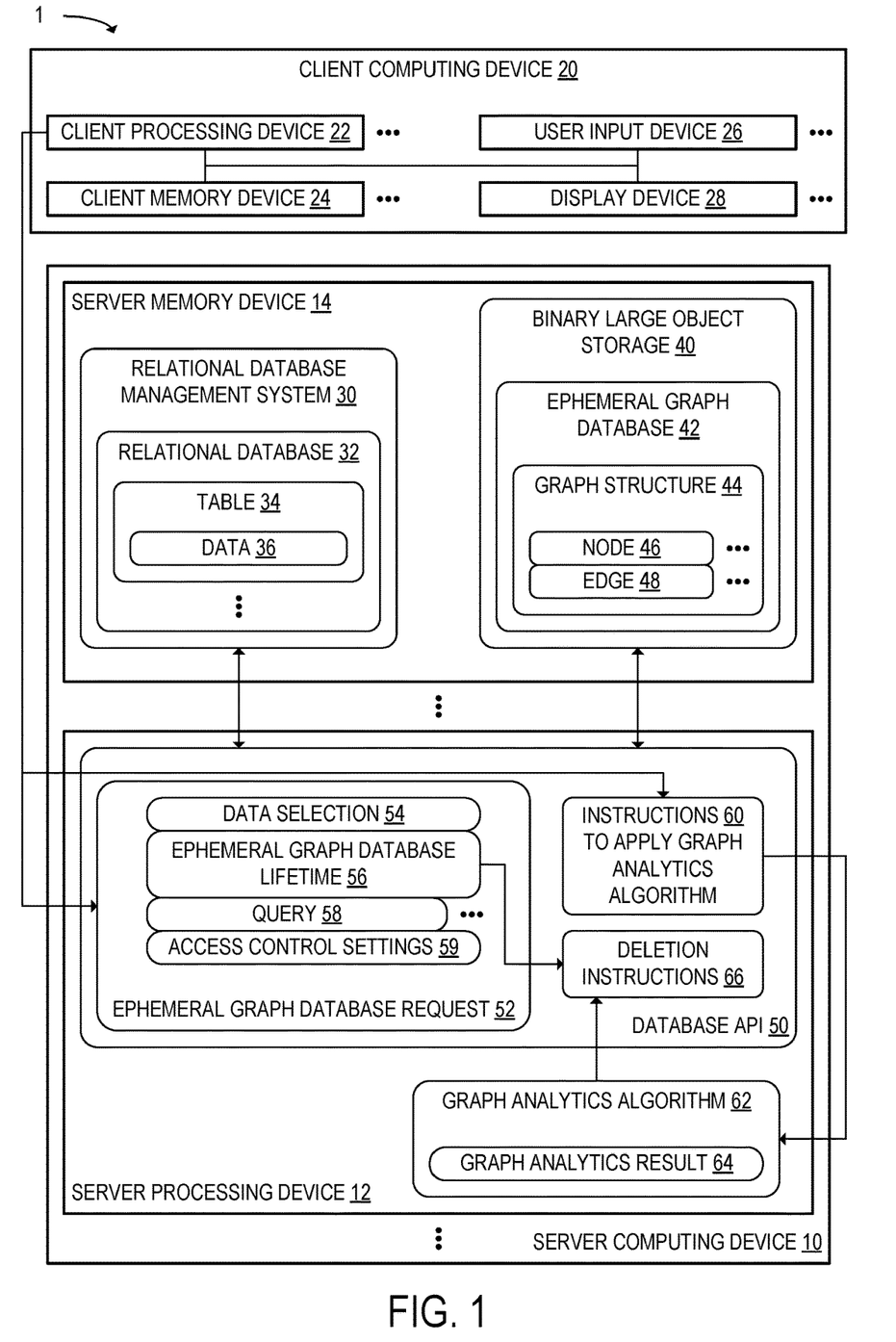
FIG. 1 schematically shows a computing system, including a server computing device and a client computing device, when an ephemeral graph database is generated and a graph analytics algorithm is applied, according to one example embodiment.

FIG. 1 schematically shows a computing system 1 including a server computing device 10 and a client computing device 20, according to one example embodiment. As depicted in the example of FIG. 1, the server computing device 10 includes one or more server processing devices 12 and one or more server memory devices 14. The server processing devices 12 include, for example, one or more central processing units (CPUs), one or more graphics processing units (GPUs), and/or one or more other hardware accelerators. The one or more server memory devices 14 include, for example, one or more volatile memory devices and one or more non-volatile storage devices.

In some examples, the one or more server processing devices 12 and the one or more server memory devices 14 are included in one or more components that combine processor and memory functionality, such as a system-on-a-chip (SoC). Additionally or alternatively, in some examples, the one or more server processing devices 12 and the one or more server memory devices 14 are distributed across a plurality of physical computing systems, such as a plurality of networked computing devices located in a data center.

The client computing device 20, as depicted in the example of FIG. 1, includes one or more client processing devices 22 and one or more client memory devices 24. The client processing devices 22 include one or more CPUs, GPUs, and/or other hardware accelerators. The client memory devices 24 include, for example, one or more volatile memory devices and one or more non-volatile storage devices. In addition, the client computing device 20 includes one or more user input devices 26 and one or more display devices 28. Example user input devices 26 such as a keyboard, a mouse, a touchscreen, a microphone, an inertial measurement unit (IMU), and/or a camera can be included in the client computing device 20. In addition to the one or more display devices 28, one or more other output devices, such as a speaker or a haptic feedback device, are also included in the client computing device in some examples. The client computing device 20 is configured to communicate with the server computing device 10.

As depicted in the example of FIG. 1, the one or more server memory devices 14 store a relational database 32 at an RDBMS 30. The relational database 32 includes one or more tables 34, each of which includes respective data 36 provided as one or more data elements. The server computing device 10 is configured to store the relational database 32 in persistent memory.

The one or more server processing devices 12 are configured to execute a database application-programming interface (API) 50. Via the database API 50, the RDBMS 30 is configured to interact with other computing processes executed at the one or more server processing devices 12. In addition, the client computing device 20 is configured to interact with the RDBMS 30 using the database API 50.

Via the database API 50, the one or more server processing devices 12 are configured to receive an ephemeral graph database request 52. The ephemeral graph database request 52 is a request to generate an ephemeral graph database 42, as discussed in further detail below. The ephemeral graph database request 52 includes a data selection 54, which is a selection of data 36 stored in the relational database 32 for inclusion in the ephemeral graph database 42. In some examples, the data selection 54 indicates all the data 36 included in the relational database 32, whereas in other examples, the data selection 54 indicates only a subset of the data 36, such as that which is included in a subset of a plurality of tables 34.

In some examples, as shown in FIG. 1, the ephemeral graph database request 52 further includes an ephemeral graph database lifetime 56. The ephemeral graph database lifetime 56 specifies a duration for which the server computing device 10 is configured to store the ephemeral graph database 42 in the one or more server memory devices 14. In some examples, as shown in FIG. 1, the ephemeral graph database request 52 further includes access control settings 59 that specify one or more users who are granted access to the ephemeral graph database 42. Different role-based permissions are indicated in the access control settings 59 in some examples, such as instructions to grant one or more users a reader role and one or more other users a maintainer role.

In the example of FIG. 1, the ephemeral graph database request 52 is received from the client computing device 20. In other examples, the database API 50 receives an ephemeral graph database request 52 originating from a computing process executed at the server computing device 10.

The one or more server processing devices 12 are further configured to generate the ephemeral graph database 42. The ephemeral graph database 42 encodes the selected data 36 in a graph structure 44 that includes a plurality of nodes 46 and edges 48. In some examples, the graph structure 44 is a directed graph structure in which the edges 48 have respective directions. In other examples, the graph structure 44 is a weighted graph structure in which the edges 48 have respective weights. In other examples, the graph structure 44 is a directed weighted graph structure. Weights and/or directions of the edges 48 can be computed from the selected data 36 with which the ephemeral graph database 42 is generated. In other examples, the graph structure 44 is an undirected unweighted graph structure.

Figure 2:
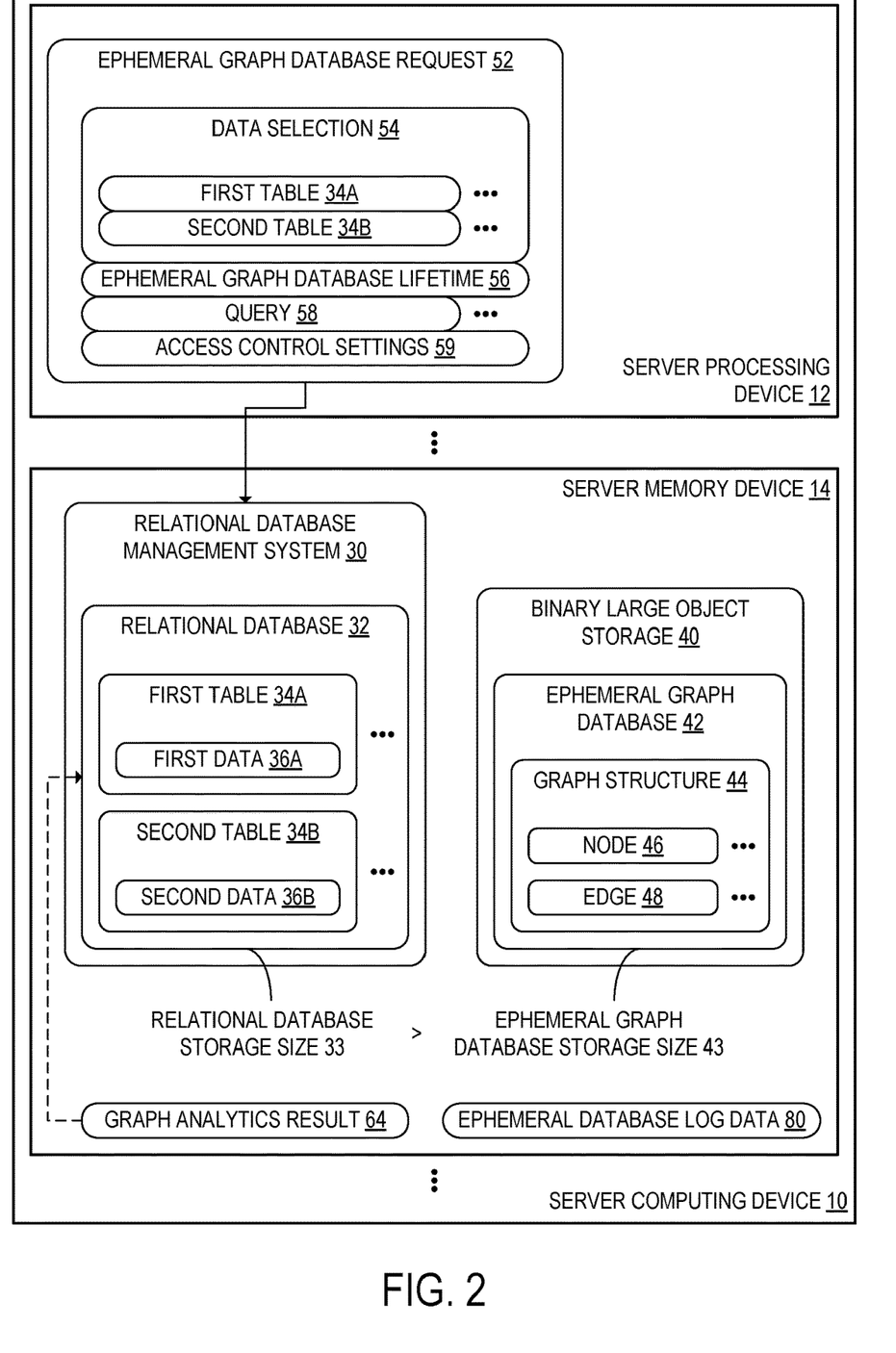
FIG. 2 schematically shows the server computing device when one or more server processing devices included in the server computing device receive an ephemeral graph database request, according to the example of FIG. 1.

FIG. 2 schematically shows the server computing device 10 in additional detail when the ephemeral graph database request 52 is received. In the ephemeral graph database request 52, according to the example of FIG. 2, the data selection 54 specifies one or more first tables 34A and one or more second tables 34B included in the relational database 32. The one or more first tables 34A store first data 36A and the one or more second tables 34B store second data 36B. The set of one or more first tables 34A overlaps with the set of one or more second tables 34B in some examples.

In the example of FIG. 2, the one or more server processing devices 12 are configured to use the one or more first tables 34A as nodes 46 of the graph structure 44. The one or more server processing devices 12 are further configured to use, as edges 48 of the graph structure 44, the one or more second tables 34B or one or more queries 58 over the one or more second tables 34B. The one or more queries 58 over the one or more second tables 34B are queries to the relational database 32 and are further included in the ephemeral graph database request 52. Accordingly, the ephemeral graph database request 52 uses the one or more queries 58 in such examples to specify the structure of the ephemeral graph database 42 in a manner that allows specification of relationships not explicitly encoded in the tables 34 included in the relational database 32. In some examples, directions and/or weights of the edges 48 are computed as specified by the one or more queries 58. Additionally or alternatively, the directions and/or weights can be computed from the second data 36B stored in the one or more second tables 34B.

The one or more server processing devices 12 are further configured to store the ephemeral graph database 42 in BLOB storage 40 at the one or more memory devices 14. FIG. 2 schematically shows the one or more server memory devices 14 when the relational database 32 is stored at the RDBMS 30 and the ephemeral graph database 42 is stored in the BLOB storage 40. However, the ephemeral graph database 42 is not stored in the RDBMS 30. By storing the ephemeral graph database 42 in BLOB storage 40 instead of in the RDBMS 30, the one or more server processing devices 12 store the ephemeral graph database 42 in a manner in which an ephemeral graph database storage size 43 of the ephemeral graph database 42 is smaller than a relational database storage size 33 of the relational database 32.

Returning to the example of FIG. 1, subsequently to storing the ephemeral graph database 42 in the BLOB storage 40, the one or more server processing devices 12 are further configured to receive, via the database API 50, instructions 60 to apply a graph analytics algorithm 62 at the ephemeral graph database 42. For example, the graph analytics algorithm 62 can be a nearest-neighbor algorithm, a centrality algorithm, a minimum-cut algorithm, a clustering algorithm, or some other algorithm that utilizes a graph structure 44 as input.

In response to receiving the instructions 60 to apply the graph analytics algorithm 62, the one or more server processing devices 12 are further configured to read the ephemeral graph database 42 from the BLOB storage 40. The ephemeral graph database 42 is read from non-volatile memory into working memory. The one or more server processing devices 12 are further configured to apply the graph analytics algorithm 62 to the ephemeral graph database 42 to generate a graph analytics result 64 as an output of the graph analytics algorithm 62.

The one or more server processing devices 12 are further configured to output the graph analytics result 64. In some examples, the graph analytics result 64 is output to the client computing device 20. Thus, the graph analytics result 64 is made available for output to the user. Additionally or alternatively, in some examples, the one or more server processing devices 12 are further configured to store the graph analytics result 64 in the relational database 32, as shown in the example of FIG. 2. Accordingly, in such examples, the graph analytics result 64 is made available for querying and for use as an input to additional analytics processes. In some examples, ephemeral graph database generation is iteratively performed in a manner that incorporates the graph analytics results 64 computed from previous iterations of the ephemeral graph database 42.

The one or more server processing devices 12 are further configured to delete the ephemeral graph database 42 from the BLOB storage 40. In some examples, the one or more server processing devices 12 are configured to delete the ephemeral graph database 42 from the BLOB storage 40 in response to outputting the graph analytics result 64. Alternatively, in examples in which the ephemeral graph database request includes an ephemeral graph database lifetime 56, the one or more server processing devices 12 are further configured to delete the ephemeral graph database 42 from the BLOB storage 40 in response to determining that the ephemeral graph database lifetime 56 has elapsed. In other examples, the ephemeral graph database 42 is deleted in response to some other event, such as receiving instructions to evict the ephemeral graph database 42 that are received prior to the end of the ephemeral graph database lifetime 56.

FIG. 2 further shows ephemeral database log data 80 stored at the one or more server memory devices 14. The ephemeral database log data 80 is organized as a plurality of records associated with respective events. Each of the records included in the ephemeral database log data 80 includes record metadata 88 such as a timestamp 88A, an event type 88B, an event identifier 88C, and/or a user identifier 88D associated with the logged event. Other types of record metadata 88 can also be included in the ephemeral database log data 80 in some examples.

Figure 3:
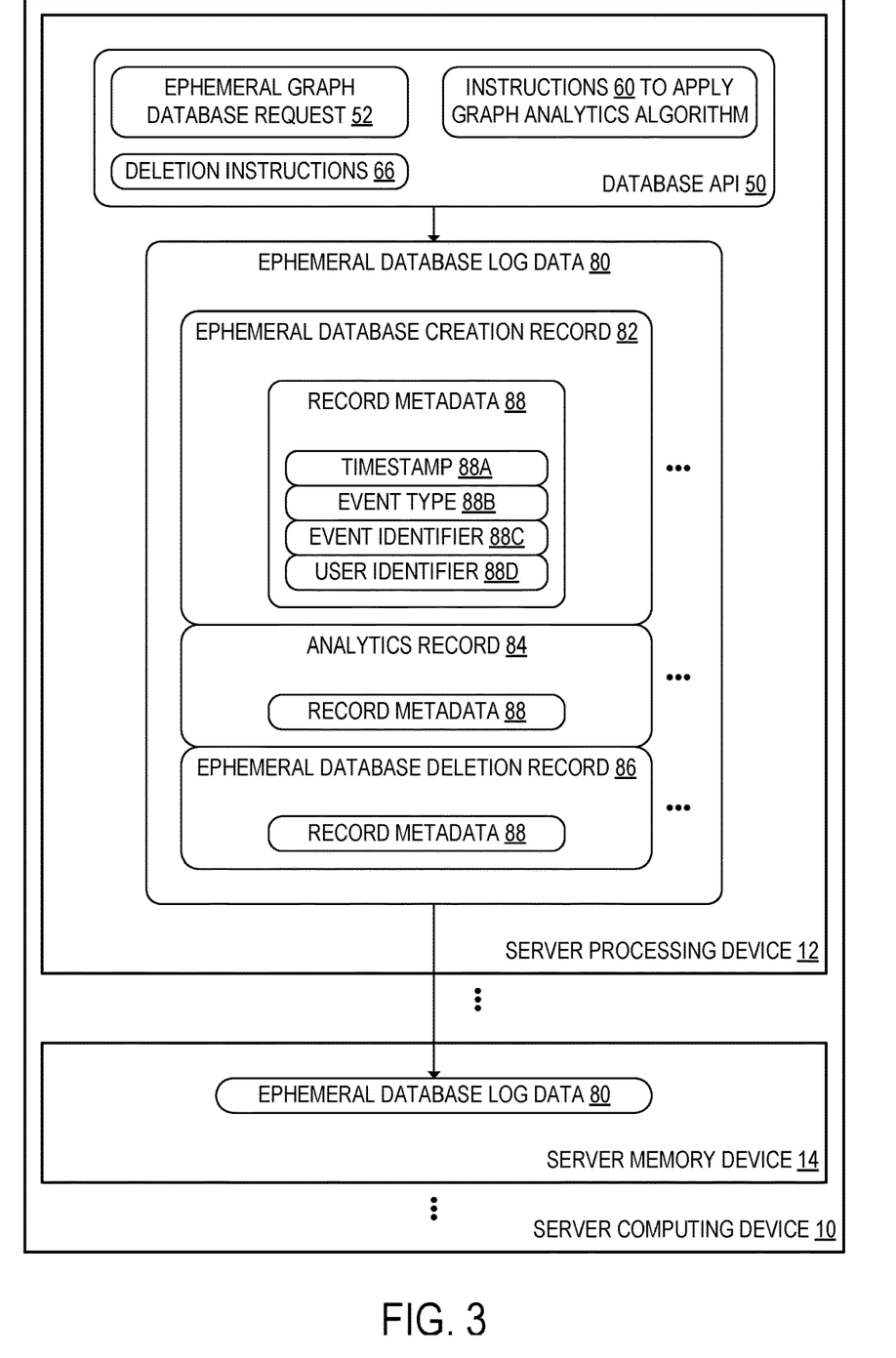
FIG. 3 schematically shows the server computing device in additional detail when ephemeral database log data is generated and stored, according to the example of FIG. 1.

The one or more server processing devices 12 are configured to generate ephemeral database log data 80 and store the ephemeral database log data 80 at the one or more server memory devices 14. FIG. 3 schematically shows the server computing device 10 in additional detail when the ephemeral database log data 80 is generated and stored. As shown in FIG. 3, the ephemeral database log data 80 includes an ephemeral database creation record 82 of generating the ephemeral graph database 42. The ephemeral database creation record 82 indicates the inputs and parameters with which the ephemeral graph database 42 is generated, as specified in the ephemeral graph database request 52.

In addition, the ephemeral database log data 80 further includes an analytics record 84 of performing the graph analytics algorithm 62. The analytics record 84 specifies the graph analytics algorithm 62 indicated in the instructions 60, as well as inputs and parameters with which the graph analytics algorithm 62 is applied to the ephemeral graph database 42. The ephemeral database log data 80 further includes an ephemeral database deletion record 86 of deleting the ephemeral graph database 42 from the BLOB storage 40.

Figure 4:
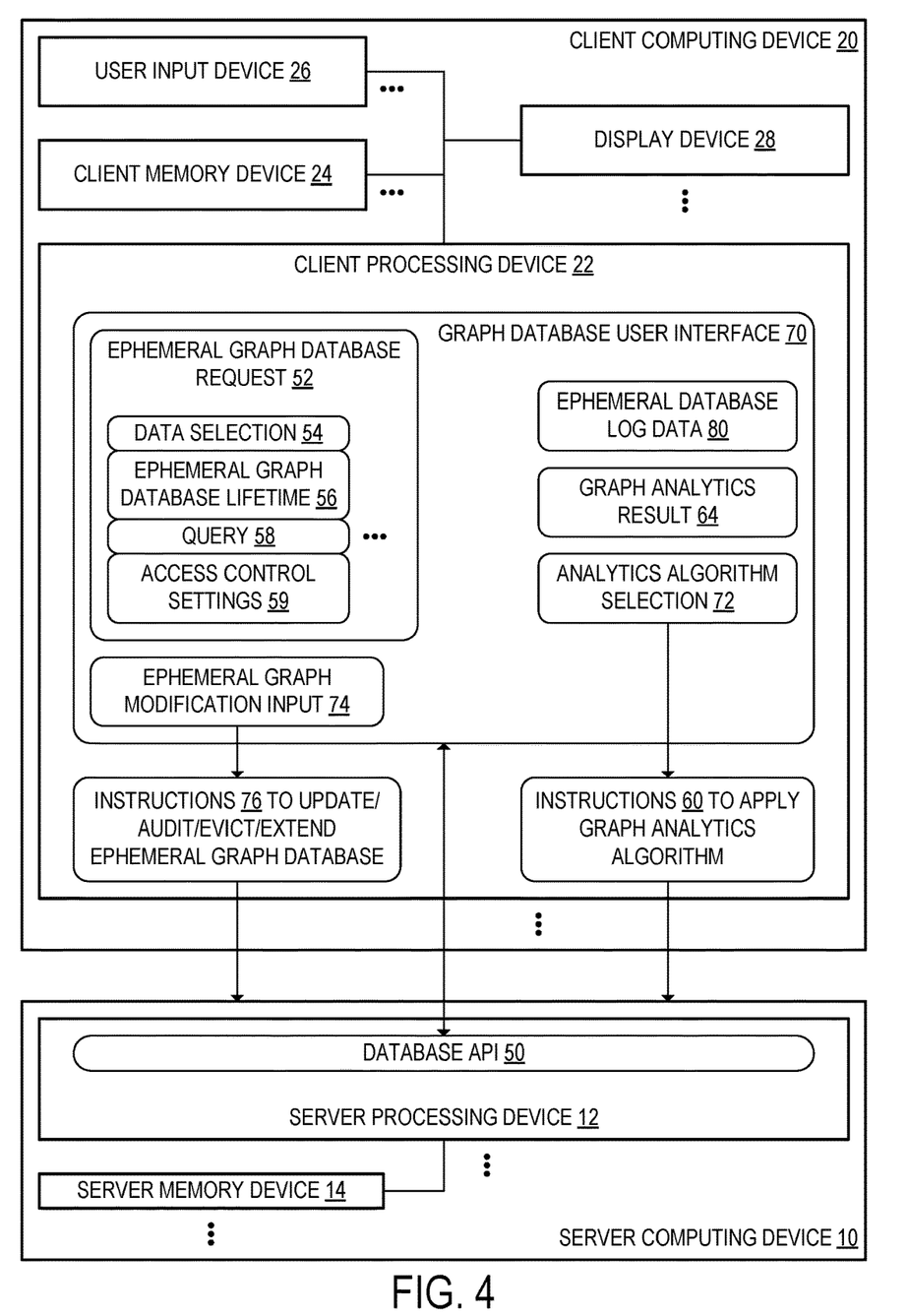
FIG. 4 schematically shows the computing system when a graph database user interface is executed at one or more client processing devices included in the client computing device, according to the example of FIG. 1.

FIG. 4 schematically shows the computing system 1 in additional detail when a graph database user interface 70 is executed at the one or more client processing devices 22 included in the client computing device 20. The graph database user interface 70 is displayed on the display device 28 and is configured to receive user interaction via the one or more user input devices 26. The graph database user interface 70 is configured to exchange data with the graph database API 50 executed at the server computing device 10.

In the example of FIG. 4, the user enters the ephemeral graph database request 52, including the data selection, the ephemeral graph database lifetime 56, and the query 58, at the graph database user interface 70. Other inputs and/or parameters that are used when generating the ephemeral graph database 42 are also entered at the graph database user interface 70 in some examples.

The one or more client processing devices 22 are further configured to receive an analytics algorithm selection 72 from the user via the graph database user interface 70 to select the graph analytics algorithm 62 that the one or more server processing devices 12 are configured to execute. Thus, the instructions 60 to apply the graph analytics algorithm 62 are generated based at least in part on the analytics algorithm selection 72 entered at the graph database user interface 70. The graph analytics result 64 is also displayed at the graph database user interface 70 in the example of FIG. 4. Thus, the output of the requested graph analytics algorithm 62 is presented to the user.

In the example of FIG. 4, the one or more client processing devices 22 are further configured to receive an ephemeral graph modification input 74 entered by the user at the graph database user interface 70. Based at least in part on the ephemeral graph modification input 74, the one or more client processing devices 22 are further configured to generate instructions 76 to update, audit, evict, or extend the ephemeral graph database 42. These instructions 76 are then transmitted to the server computing device 10.

The one or more server processing devices 12 are further configured to, via the database API 50, receive the instructions 76 to update, audit, evict, or extend the ephemeral graph database 42. The one or more server processing devices 12 are further configured to update, audit, evict, or extend the ephemeral graph database 42 as indicated by the instructions 76.

When the one or more server processing devices 12 update the ephemeral graph database 42, the one or more server processing devices 12 modify one or more of the nodes 46 and/or edges 48 of the ephemeral graph database 42. In some examples, this modification is to the topology of the graph structure 44. Such modifications include, for example, adding or removing one or more nodes 46 and/or adding or removing one or more edges 48. In some examples, the one or more server processing devices 12 additionally or alternatively modify data 36 stored at the nodes 46 and/or edges 48.

In some examples, when the instructions 76 are executed, the one or more server processing devices 12 are further configured to audit the ephemeral graph database 42. Auditing the ephemeral graph database 42 includes retrieving at least a portion of the ephemeral database log data 80 associated with the ephemeral graph database 42. In some examples, auditing the ephemeral graph database 42 includes obtaining the respective user identifiers 88D included in the record metadata 88 of a plurality of records stored in the ephemeral database log data 80. Other portions of the ephemeral database log data 80, such as a plurality of timestamps 88A associated with the records, are also retrieved during the database audit in some examples. The one or more server processing devices 12 are further configured to output the selected ephemeral database log data 80 for display at the graph database user interface 70. Accordingly, performing the database audit of the ephemeral graph database 42 allows the user to determine whether prior use of the ephemeral graph database 42 satisfies a data usage policy such as a data privacy policy or a database access permission policy.

In examples in which the one or more server processing devices 12 are configured to evict the ephemeral graph database 42, the one or more server processing devices 12 are configured to delete the ephemeral graph database 42 from the one or more server memory devices 14 before the ephemeral graph database lifetime 56 has elapsed. In examples in which the one or more server processing devices 12 are configured to extend the ephemeral graph database 42, the one or more server processing devices 12 are configured to increase the ephemeral graph database lifetime 56. Thus, in such examples, the user controls the caching duration of the ephemeral graph database 42 via the ephemeral graph modification input 74.

In some examples, actions other than updating, auditing, evicting, or extending the ephemeral graph database 42 may be indicated in the instructions 76. For example, the instructions 76 may indicate a modification to the access control settings 59.

Figure 5:
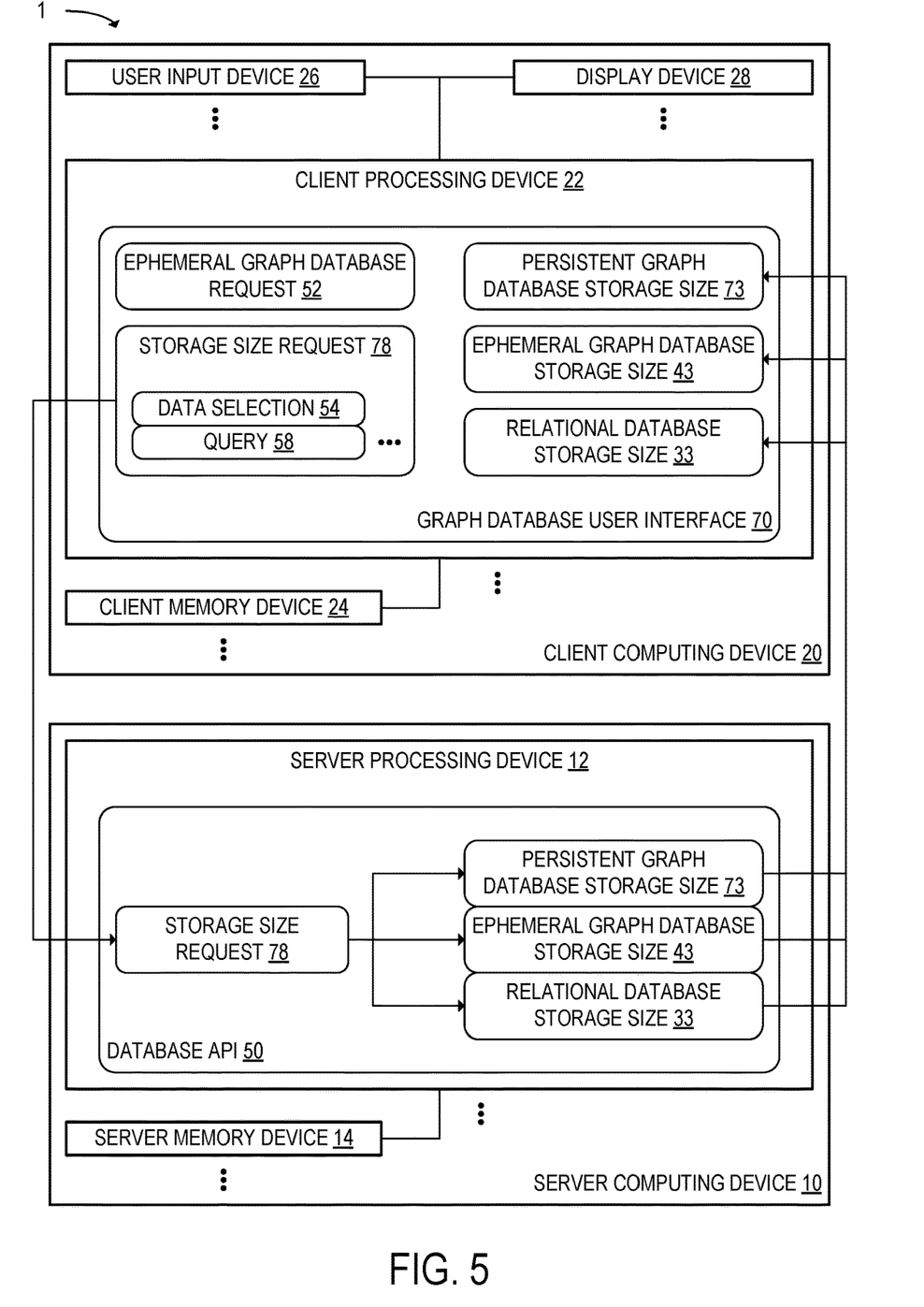
FIG. 5 schematically shows the computing system when an ephemeral graph database storage size is requested and displayed at the client computing device, according to the example of FIG. 1.

FIG. 5 schematically shows the computing system 1 in an example in which the user previews the ephemeral graph database storage size 43 of the ephemeral graph database 42. Prior to generating the ephemeral graph database 42, the one or more server processing devices 12 are further configured to receive a storage size request 78 from the client computing device 20. The one or more server processing devices 12 are further configured to compute the ephemeral graph database storage size 43 and convey the ephemeral graph database storage size 43 to the client computing device 20 for display at the graph database user interface 70. The relational database storage size 33 is also transmitted to the client computing device 20 in some examples.

In the example of FIG. 5, the one or more server processing devices 12 are further configured to compute a persistent graph database storage size 73 in response to receiving the storage size request 78. The persistent graph database storage size 73 is a size that a persistent graph database would have if it were generated with the same data selection 54 as the ephemeral graph database 42 but stored in the RDBMS 30 instead of in the BLOB storage 40. The one or more server processing devices 12 are further configured to transmit the persistent graph database storage size 73 to the client computing device 20 for display at the graph database user interface 70.

In some examples, the storage size request 78 is received prior to the ephemeral graph database request 52. Accordingly, in such examples, the user can refer to the ephemeral graph database storage size 43, the relational database storage size 33, and the persistent graph database storage size 73 when determining whether to instruct the server computing device 10 to generate an ephemeral graph database 42 or a persisted copy of the relational database 32.

Figure 6:
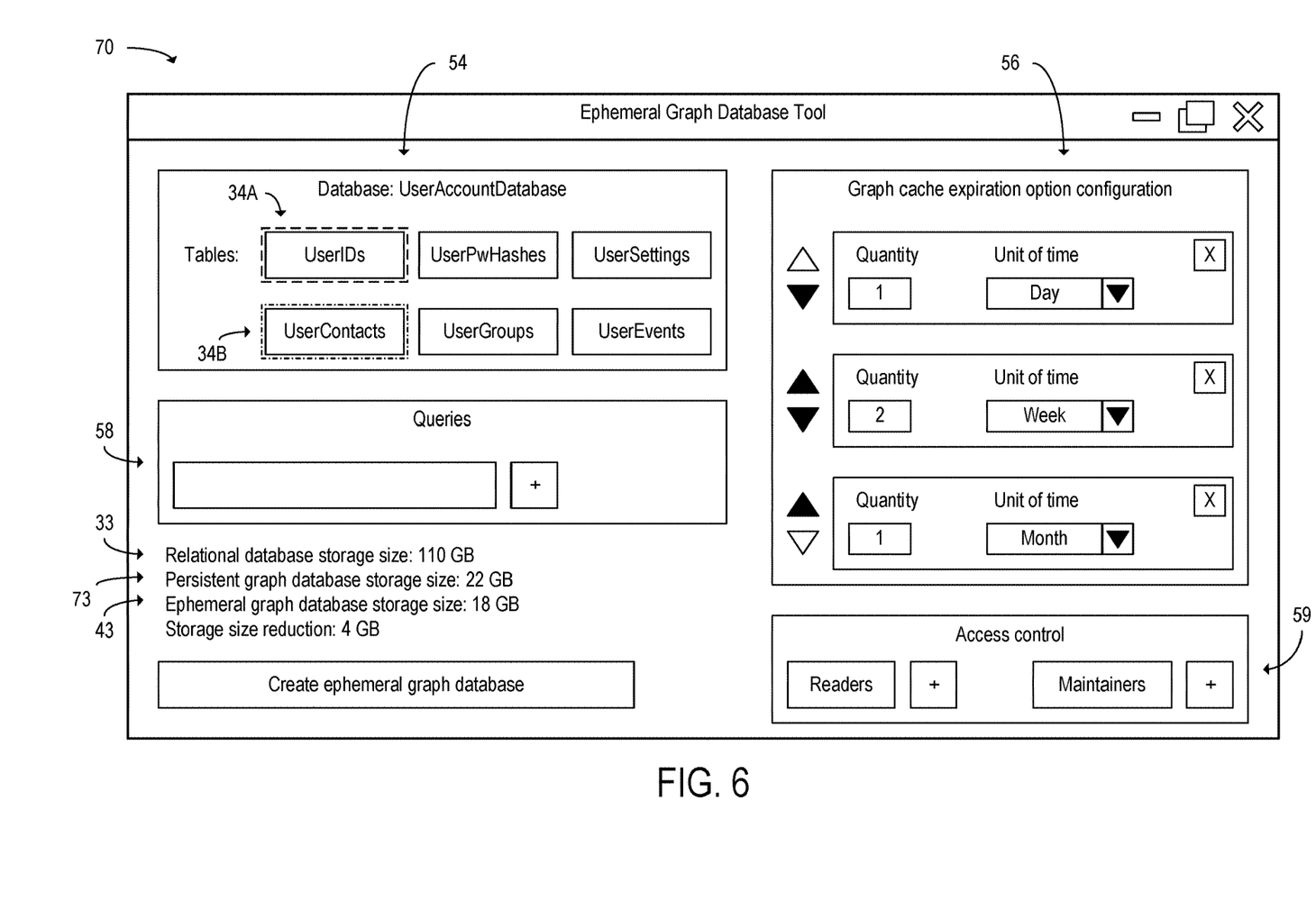
FIG. 6 shows an example graph database user interface configured to be displayed at the display device of the client computing device, according to the example of FIG. 1.

FIG. 6 shows an example graph database user interface 70 configured to be displayed at the display device 28 of the client computing device 20. The graph database user interface 70 shown in the example of FIG. 6 includes interface elements configured to receive user input specifying the one or more tables 34 indicated in the data selection 54. In the example of FIG. 6, the user has selected a first table 34A and a second table 34B with which the one or more server processing devices 12 are configured to generate the ephemeral graph database 42, as indicated by the two different types of highlighting shown in the data selection 54.

The graph database user interface 70 depicted in FIG. 6 further includes an interface element configured to receive a user selection of the ephemeral graph database lifetime 56. In the example of FIG. 6, the user instructs the server computing device 10 to store the ephemeral graph database 42 in the BLOB storage 40 for one month and 15 days. The graph database user interface 70 further includes an interface element configured to receive a specification of one or more queries 58 that are used when constructing the ephemeral graph database 42.

The graph database user interface 70 shown in FIG. 6 also displays the relational database storage size 33 and the ephemeral graph database storage size 43. In this example, the graph database user interface 70 further displays a persistent graph database storage size 73. The graph database user interface 70 further shows a storage size reduction achieved by generating the ephemeral graph database 42 instead of the persistent graph database.

The graph database user interface 70 shown in FIG. 6 further includes an interface element configured to receive a user selection of access control settings 59. In the example of FIG. 6, the user may add or remove users as readers or maintainers of the ephemeral graph database 42 by interacting with the graph database user interface 70.

Figure 7A:
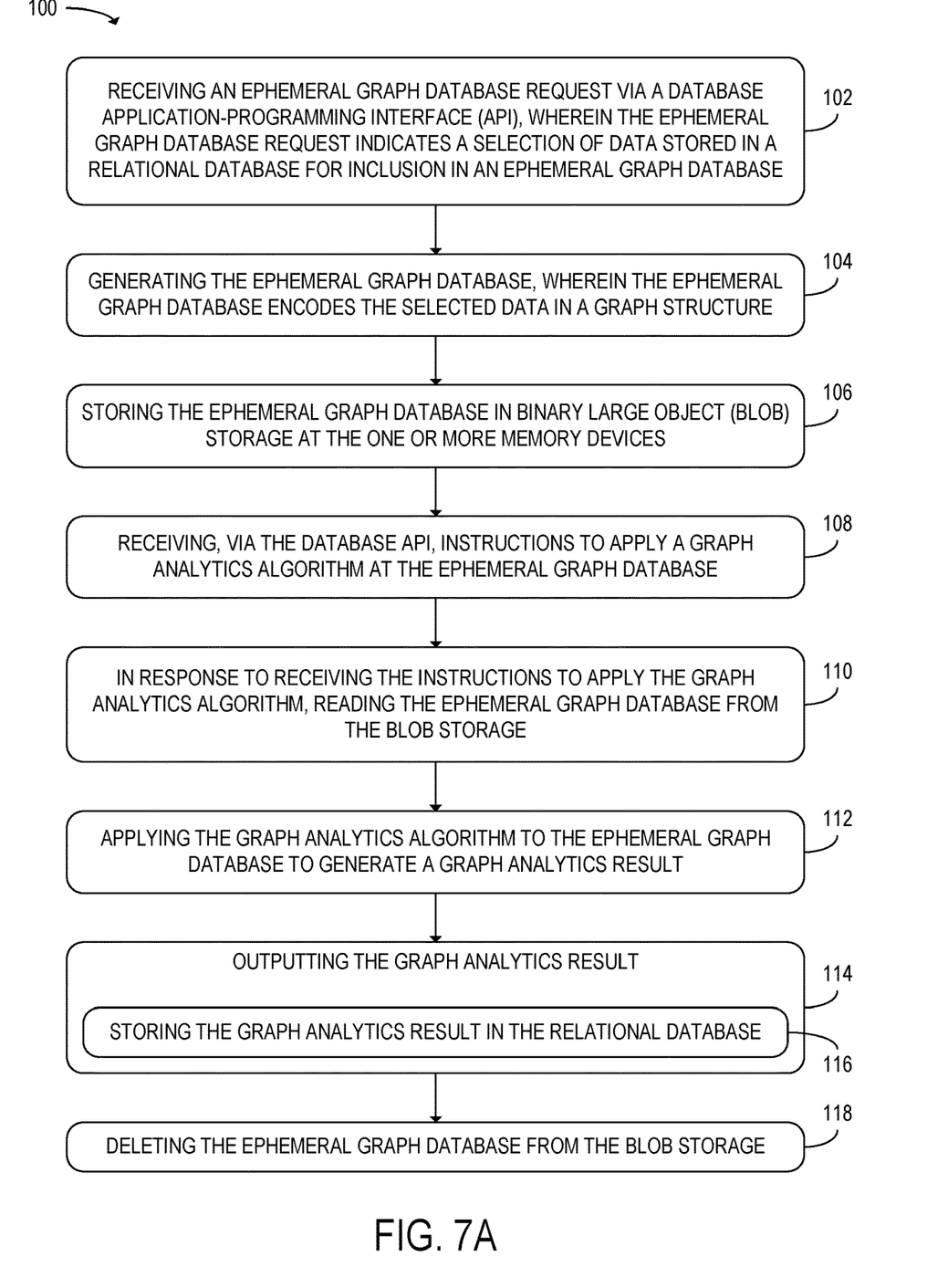
FIG. 7A shows a flowchart of method for use with a server computing device to generate an ephemeral graph database and execute a graph analytics algorithm, according to the example of FIG. 1.

FIG. 7A shows a flowchart of method 100 for use with a server computing device, according to one example. At the server computing device with which the method 100 is performed, a relational database is stored at an RDBMS in one or more server memory devices of the server computing device. The relational database includes data organized into one or more tables. The steps of the method 100 are executed at one or more server processing devices included in the server computing devices.

At step 102, the method 100 includes receiving an ephemeral graph database request via a database API. The ephemeral graph database request indicates a selection of data stored in the relational database for inclusion in an ephemeral graph database. In some examples, the ephemeral graph database request indicates a plurality of tables included in the relational database with which the ephemeral graph database is configured to be generated. The plurality of tables includes, for example, one or more first tables included in the relational database that are configured to be used as nodes of a graph structure and one or more second tables included in the relational database that are configured to be used as edges of the graph structure.

The ephemeral graph database request further includes, in some examples, one or more queries to the relational database. In examples in which the ephemeral graph database request specifies one or more first tables and one or more second tables, the one or more queries can be queries over the one or more second tables.

In some examples, the ephemeral graph database request further includes an ephemeral graph database lifetime. The ephemeral graph database lifetime indicates a duration for which the one or more server memory devices are configured to retain the ephemeral graph database. Access control settings that specify access permissions of one or more users of the ephemeral graph database may also be included in the ephemeral graph database request in some examples.

At step 104, the method 100 further includes generating the ephemeral graph database. The ephemeral graph database encodes the selected data in the graph structure indicated in the ephemeral graph database request. At step 106, the method 100 further includes storing the ephemeral graph database in BLOB storage at the one or more server memory devices. Storing the ephemeral graph database in the BLOB storage instead of the RDBMS allows the storage size of the ephemeral graph database to be reduced. In addition, upkeep costs related to database auditing, RDBMS maintenance, and data quality errors are reduced in some examples by storing the ephemeral graph database in the BLOB storage. Ongoing costs as well as up-front costs are thereby reduced in such examples.

At step 108, the method 100 further includes receiving, via the database API, instructions to apply a graph analytics algorithm at the ephemeral graph database. Example types of graph analytics algorithms include nearest-neighbor algorithms, centrality algorithms, minimum-cut algorithms, and clustering algorithms. Other types of graph analytics algorithms are performed in other examples. At step 110, in response to receiving the instructions to apply the graph analytics algorithm, the method 100 further includes reading the ephemeral graph database from the BLOB storage. The ephemeral graph database is read into working memory when step 110 is performed.

At step 112, the method 100 further includes applying the graph analytics algorithm to the ephemeral graph database to generate a graph analytics result. In addition, at step 114, the method 100 further includes outputting the graph analytics result. In some examples, step 114 includes, at step 116, storing the graph analytics result in the relational database. Additionally or alternatively, step 114 can include outputting the graph analytics result to a client computing device for display at a graph database user interface.

At step 118, the method 100 further includes deleting the ephemeral graph database from the BLOB storage. In examples in which the ephemeral graph database request includes an ephemeral graph lifetime, the ephemeral graph database is configured to be deleted from the BLOB storage in response to determining that the ephemeral graph database lifetime has elapsed. In other examples, the ephemeral graph database is deleted from the BLOB storage in response to outputting the graph analytics result. The ephemeral graph database is accordingly maintained for a specified period of time. By deleting the ephemeral graph database from the BLOB storage, costs associated with maintaining the ephemeral graph database are avoided.

Figure 7B:
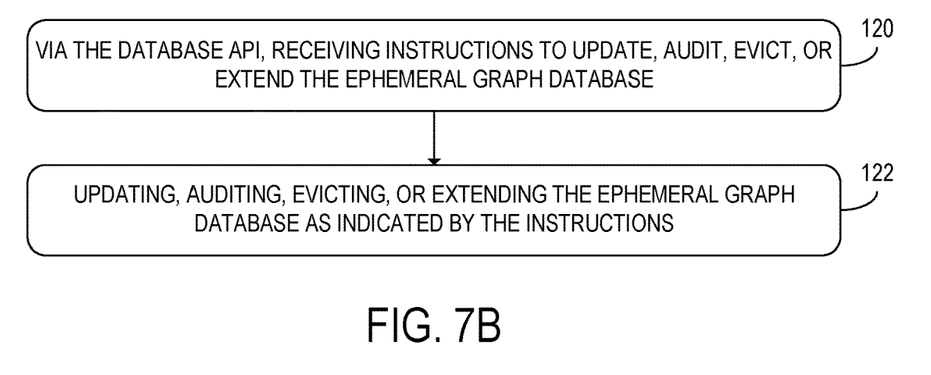
FIGS. 7B-7D show additional steps of the method of FIG. 7A that are performed in some examples.

FIG. 7B shows additional steps of the method 100 that are performed in some examples. As shown in FIG. 7B, the method 100 further includes step 120 in some examples. At step 120, the method 100 further includes receiving instructions to update, audit, evict, or extend the ephemeral graph database. These instructions are received via the database API. These instructions are received from the client computing device in some examples. At step 122, the method 100 further includes updating, auditing, evicting, or extending the ephemeral graph database as indicated by the instructions. Accordingly, the ephemeral graph database is modified, ephemeral database log data is retrieved, or the ephemeral graph database lifetime is modified in response to the instructions. The instructions to update, audit, evict, or extend the ephemeral graph database are user-specified in some examples, whereas in other examples, such instructions are programmatically output by some other computing process executed at the client computing device or the server computing device.

Figure 7C:
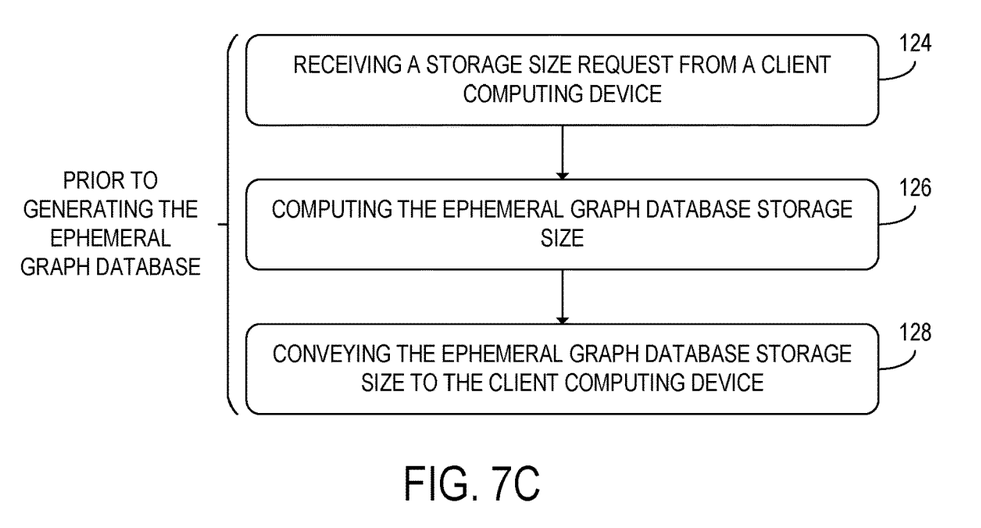

FIG. 7C shows steps that are performed in some examples prior to generating the ephemeral graph database. At step 124, the method 100 further includes receiving a storage size request from a client computing device. In some examples, the storage size request is received prior to receiving the ephemeral graph database request at step 102, whereas in other examples, the storage size request is included in the ephemeral graph database request.

At step 126, the method 100 further includes computing the ephemeral graph database storage size. At step 128, the method 100 further includes conveying the ephemeral graph database storage size to the client computing device. A relational database storage size of the relational database is also conveyed to the client computing device in some examples. Additionally or alternatively, the size of a persistent graph database that would be stored in the RDBMS is computed and conveyed to the client computing device in some examples in response to receiving the ephemeral graph database request.

Figure 7D:
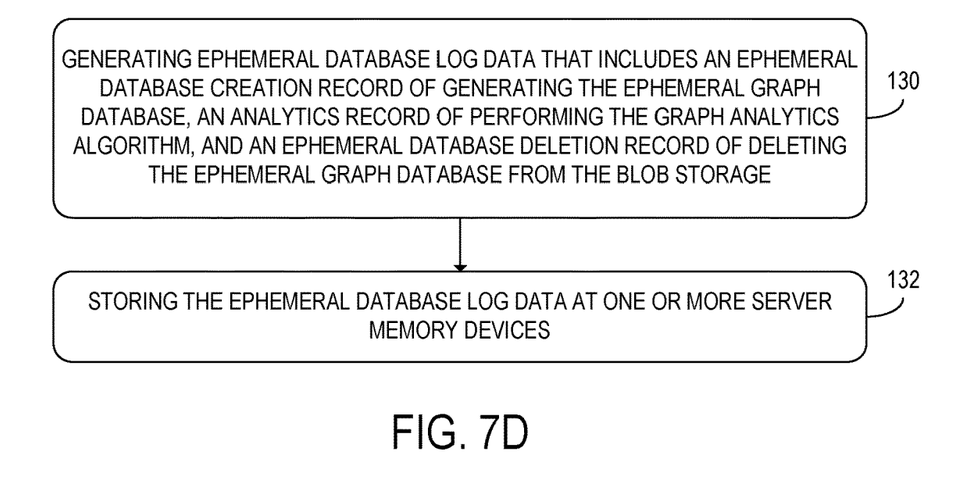

FIG. 7D shows additional steps of the method 100 that are performed in some examples. At step 130, the method 100 further includes generating ephemeral database log data that includes an ephemeral database creation record of generating the ephemeral graph database, an analytics record of performing the graph analytics algorithm, and an ephemeral database deletion record of deleting the ephemeral graph database from the BLOB storage. Each of these records includes record metadata such as a timestamp, an event type, an event identifier, and/or a user identifier. In some examples, records are also generated in response to types of events other than creating the ephemeral database, performing the graph analytics algorithm, and deleting the ephemeral graph database.

At step 132, the method 100 further includes storing the ephemeral database log data at one or more server memory devices. The stored ephemeral database log data is retrievable during database auditing, during which the ephemeral database log data is transmitted to the client computing device.

Using the devices and methods discussed above, graph analytics are performed at a relational database that does not have an explicit graph structure when stored at an RDBMS. These graph analytics are performed on an ephemeral graph database that is generated to be used as an input to a graph analytics algorithm. The ephemeral graph database is stored in BLOB storage instead of in the RDBMS. Subsequently to performing the graph analytics algorithm, the ephemeral graph database is deleted from the BLOB storage. The above devices and methods reduce the amount of storage space used and the costs associated with database maintenance.

In some embodiments, the methods and processes described herein are tied to a computing system of one or more computing devices. In such examples, such methods and processes are implemented as a computer-application program or service, an application-programming interface (API), a library, and/or other computer-program product.

Figure 8:
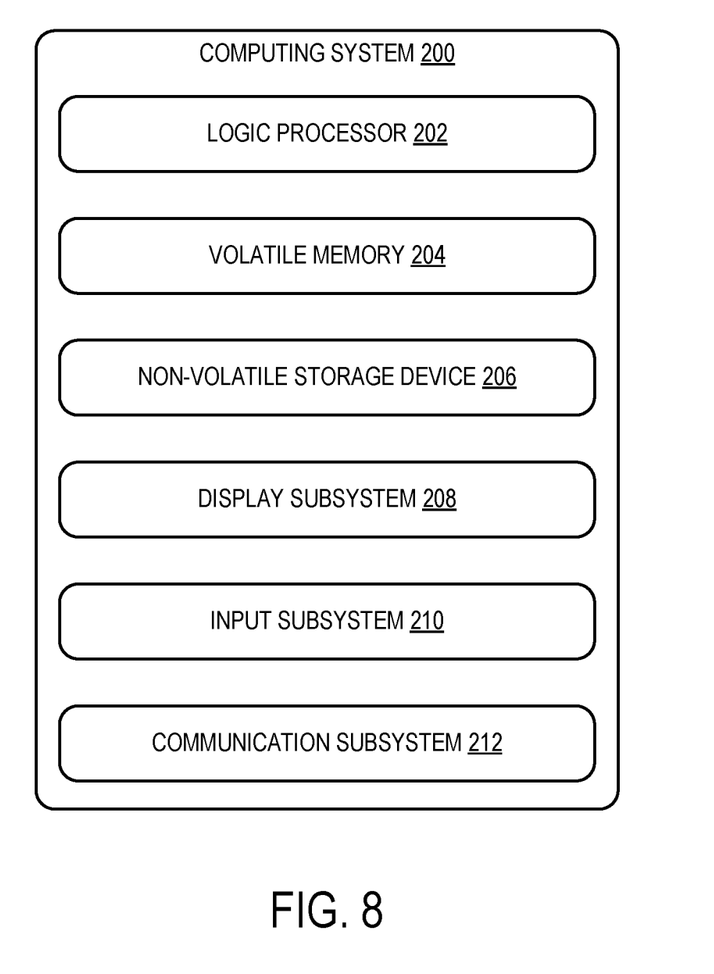
FIG. 8 schematically shows a computing environment in which the computing system is instantiated, according to the example of FIG. 1.

FIG. 8 schematically shows a non-limiting embodiment of a computing system 200 that can enact one or more of the methods and processes described above. Computing system 200 is shown in simplified form. Computing system 200 can embody the computing system 1 described above and illustrated in FIG. 1. Components of computing system 200 are, for example, included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 optionally includes a display subsystem 208, input subsystem 210, communication subsystem 212, and/or other components not shown in FIG. 8.

Logic processor 202 includes one or more physical devices configured to execute instructions. For example, the logic processor 202 is configured to execute instructions that are part of one or more applications, programs, routines, libraries, objects, components, data structures, or other logical constructs. Such instructions are implemented to perform a task, implement a data type, transform the state of one or more components, achieve a technical effect, or otherwise arrive at a desired result.

The logic processor 202 includes one or more physical processors configured to execute software instructions. Additionally or alternatively, in some examples, the logic processor 202 includes one or more hardware logic circuits or firmware devices configured to execute hardware-implemented logic or firmware instructions. Processors of the logic processor 202 are single-core or multi-core, and the instructions executed thereon are configured for sequential, parallel, and/or distributed processing. Individual components of the logic processor 202 are optionally distributed among two or more separate devices, which in some examples are remotely located and/or configured for coordinated processing. In some examples, aspects of the logic processor 202 are virtualized and executed by remotely accessible, networked computing devices configured in a cloud-computing configuration. In such a case, these virtualized aspects are run on different physical logic processors of various different machines.

Non-volatile storage device 206 includes one or more physical devices configured to hold instructions executable by the logic processors to implement the methods and processes described herein. When such methods and processes are implemented, the state of non-volatile storage device 206 is transformed—e.g., to hold different data.

Non-volatile storage device 206 includes physical devices that are removable and/or built in. Non-volatile storage device 206 can include optical memory, semiconductor memory, and/or magnetic memory, or other mass storage device technology. Non-volatile storage device 206 can include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 includes physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 are, in some examples, integrated together into one or more hardware-logic components. Examples of such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" are used to describe an aspect of computing system 200 typically implemented in software by a processor to perform a particular function using portions of volatile memory, which involves transformative processing that specially configures the processor to perform the function. Thus, a module, program, or engine can be instantiated via logic processor 202 executing instructions held by non-volatile storage device 206, using portions of volatile memory 204. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

A display subsystem 208 is used in some examples to present a visual representation of data held by non-volatile storage device 206. The visual representation, for example, takes the form of a graphical user interface (GUI). In such examples, as the herein described methods and processes change the data held by the non-volatile storage device, and thus transform the state of the non-volatile storage device, the state of display subsystem 208 is likewise be transformed to visually represent changes in the underlying data. Display subsystem 208 includes one or more display devices utilizing virtually any type of display technology. In some examples, such display devices are combined with logic processor 202, volatile memory 204, and/or non-volatile storage device 206 in a shared enclosure. In other examples, such display devices are peripheral display devices.

When included, input subsystem 210 comprises or interfaces with one or more user-input devices such as a keyboard, mouse, touch screen, camera, or microphone.

When included, communication subsystem 212 is configured to communicatively couple various computing devices described herein with each other, and with other devices. Communication subsystem 212, for example, includes one or more wired and/or wireless communication devices compatible with one or more different communication protocols. As non-limiting examples, the communication subsystem is configured for communication via a wired or wireless local- or wide-area network, broadband cellular network, etc. In some embodiments, the communication subsystem allows computing system 200 to send and/or receive messages to and/or from other devices via a network such as the Internet.

Further, the disclosure comprises configurations according to the following clauses.

Clause 1. A server computing device comprising: one or more server memory devices storing a relational database; and one or more server processing devices configured to: receive an ephemeral graph database request via a database application-programming interface (API), wherein the ephemeral graph database request indicates a selection of data stored in the relational database for inclusion in an ephemeral graph database; generate the ephemeral graph database, wherein the ephemeral graph database encodes the selected data in a graph structure; store the ephemeral graph database in binary large object (BLOB) storage at the one or more server memory devices; receive, via the database API, instructions to apply a graph analytics algorithm at the ephemeral graph database; in response to receiving the instructions to apply the graph analytics algorithm, read the ephemeral graph database from the BLOB storage; apply the graph analytics algorithm to the ephemeral graph database to generate a graph analytics result; output the graph analytics result; and delete the ephemeral graph database from the BLOB storage.

Clause 2. The server computing device of Clause 1, wherein: the relational database is stored in a relational database management system (RDBMS); and the ephemeral graph database is not stored in the RDBMS.

Clause 3. The server computing device of Clause 1 or 2, wherein: the ephemeral graph database request further includes an ephemeral graph database lifetime; and the one or more server processing devices are further configured to delete the ephemeral graph database from the BLOB storage in response to determining that the ephemeral graph database lifetime has elapsed.

Clause 4. The server computing device of any of Clauses 1-3, wherein the one or more server processing devices are configured to delete the ephemeral graph database from the BLOB storage in response to outputting the graph analytics result.

Clause 5. The server computing device of any of Clauses 1-4, wherein the ephemeral graph database includes: as nodes of the graph structure, one or more first tables included in the relational database; and as edges of the graph structure: one or more second tables included in the relational database; and/or one or more queries over the one or more second tables.

Clause 6. The server computing device of any of Clauses 1-5, wherein the one or more server processing devices are further configured to store the graph analytics result in the relational database.

Clause 7. The server computing device of any of Clauses 1-6, wherein the one or more server processing devices are further configured to: via the database API, receive instructions to update, audit, evict, or extend the ephemeral graph database; and update, audit, evict, or extend the ephemeral graph database as indicated by the instructions.

Clause 8. The server computing device of any of Clauses 1-7, wherein an ephemeral graph database storage size of the ephemeral graph database is smaller than a relational database storage size of the relational database.

Clause 9. The server computing device of Clause 8, wherein the one or more server processing devices are further configured to, prior to generating the ephemeral graph database: receive a storage size request from a client computing device; compute the ephemeral graph database storage size; and convey the ephemeral graph database storage size to the client computing device.

Clause 10. The server computing device of any of Clauses 1-9, wherein the one or more server processing devices are further configured to: generate ephemeral database log data that includes: an ephemeral database creation record of generating the ephemeral graph database; an analytics record of performing the graph analytics algorithm; and an ephemeral database deletion record of deleting the ephemeral graph database from the BLOB storage; and store the ephemeral database log data at the one or more server memory devices.

Clause 11. A method for use with a server computing device, the method comprising: receiving an ephemeral graph database request via a database application-programming interface (API), wherein the ephemeral graph database request indicates a selection of data stored in a relational database for inclusion in an ephemeral graph database; generating the ephemeral graph database, wherein the ephemeral graph database encodes the selected data in a graph structure; storing the ephemeral graph database in binary large object (BLOB) storage at the one or more server memory devices; receiving, via the database API, instructions to apply a graph analytics algorithm at the ephemeral graph database; in response to receiving the instructions to apply the graph analytics algorithm, reading the ephemeral graph database from the BLOB storage; applying the graph analytics algorithm to the ephemeral graph database to generate a graph analytics result; outputting the graph analytics result; and deleting the ephemeral graph database from the BLOB storage.

Clause 12. The method of Clause 11, wherein: the ephemeral graph database request further includes an ephemeral graph database lifetime; and the ephemeral graph database is deleted from the BLOB storage in response to determining that the ephemeral graph database lifetime has elapsed.

Clause 13. The method of Clause 11 or 12, wherein the ephemeral graph database is deleted from the BLOB storage in response to outputting the graph analytics result.

Clause 14. The method of any of Clauses 11-13, wherein the ephemeral graph database includes: as nodes of the graph structure, one or more first tables included in the relational database; and as edges of the graph structure: one or more second tables included in the relational database; and/or one or more queries over the one or more second tables.

Clause 15. The method of any of Clauses 11-14, further comprising storing the graph analytics result in the relational database.

Clause 16. The method of any of Clauses 11-15, further comprising: via the database API, receiving instructions to update, audit, evict, or extend the ephemeral graph database; and updating, auditing, evicting, or extending the ephemeral graph database as indicated by the instructions.

Clause 17. The method of any of Clauses 11-16, wherein an ephemeral graph database storage size of the ephemeral graph database is smaller than a relational database storage size of the relational database.

Clause 18. The method of Clause 17, further comprising prior to generating the ephemeral graph database: receiving a storage size request from a client computing device; computing the ephemeral graph database storage size; and conveying the ephemeral graph database storage size to the client computing device.

Clause 19. The method of any of Clauses 11-18, further comprising: generating ephemeral database log data that includes: an ephemeral database creation record of generating the ephemeral graph database; an analytics record of performing the graph analytics algorithm; and an ephemeral database deletion record of deleting the ephemeral graph database from the BLOB storage; and storing the ephemeral database log data at one or more server memory devices.

Clause 20. A computing system comprising: one or more memory devices storing a relational database in a relational database management system (RDBMS); and one or more processing devices configured to: receive an ephemeral graph database request, wherein the ephemeral graph database request indicates a selection of data stored in the relational database for inclusion in an ephemeral graph database; generate the ephemeral graph database, wherein the ephemeral graph database encodes the selected data in a graph structure; store the ephemeral graph database in binary large object (BLOB) storage at the one or more memory devices without storing the ephemeral graph database in the RDBMS; receive instructions to apply a graph analytics algorithm at the ephemeral graph database; in response to receiving the instructions to apply the graph analytics algorithm, read the ephemeral graph database from the BLOB storage; apply the graph analytics algorithm to the ephemeral graph database to generate a graph analytics result; output the graph analytics result; and delete the ephemeral graph database from the BLOB storage.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein represent one or more of any number of processing strategies. As such, various acts illustrated and/or described are performable in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server computing device comprising:
one or more server memory devices storing a relational database; and
one or more server processing devices configured to:
receive an ephemeral graph database request via a database application-programming interface (API), wherein the ephemeral graph database request indicates a selection of data stored in the relational database for inclusion in an ephemeral graph database;
prior to generating the ephemeral graph database:
receive a storage size request from a client computing device;
compute an ephemeral graph database storage size; and
convey the ephemeral graph database storage size to the client computing device, wherein the ephemeral graph database storage size of the ephemeral graph database is smaller than a relational database storage size of the relational database;
generate the ephemeral graph database, wherein the ephemeral graph database encodes the selected data in a graph structure;
store the ephemeral graph database in binary large object (BLOB) storage at the one or more server memory devices;
receive, via the database API, instructions to apply a graph analytics algorithm at the ephemeral graph database;
in response to receiving the instructions to apply the graph analytics algorithm, read the ephemeral graph database from the BLOB storage;
apply the graph analytics algorithm to the ephemeral graph database to generate a graph analytics result;
output the graph analytics result; and
delete the ephemeral graph database from the BLOB storage.

2. The server computing device of claim 1, wherein:
the relational database is stored in a relational database management system (RDBMS); and
the ephemeral graph database is not stored in the RDBMS.

3. The server computing device of claim 1, wherein:
the ephemeral graph database request further includes an ephemeral graph database lifetime; and
the one or more server processing devices are further configured to delete the ephemeral graph database from the BLOB storage in response to determining that the ephemeral graph database lifetime has elapsed.

4. The server computing device of claim 1, wherein the one or more server processing devices are configured to delete the ephemeral graph database from the BLOB storage in response to outputting the graph analytics result.

5. The server computing device of claim 1, wherein the ephemeral graph database includes:
as nodes of the graph structure, one or more first tables included in the relational database; and
as edges of the graph structure:
one or more second tables included in the relational database; and/or
one or more queries over the one or more second tables.

6. The server computing device of claim 1, wherein the one or more server processing devices are further configured to store the graph analytics result in the relational database.

7. The server computing device of claim 1, wherein the one or more server processing devices are further configured to:
via the database API, receive instructions to update, audit, evict, or extend the ephemeral graph database; and
update, audit, evict, or extend the ephemeral graph database as indicated by the instructions.

8. The server computing device of claim 1, wherein the one or more server processing devices are further configured to:
generate ephemeral database log data that includes:
an ephemeral database creation record of generating the ephemeral graph database;
an analytics record of performing the graph analytics algorithm; and
an ephemeral database deletion record of deleting the ephemeral graph database from the BLOB storage; and
store the ephemeral database log data at the one or more server memory devices.

9. A method for use with a server computing device, the method comprising:
receiving an ephemeral graph database request via a database application-programming interface (API), wherein the ephemeral graph database request indicates a selection of data stored in a relational database for inclusion in an ephemeral graph database;

prior to generating the ephemeral graph database:
- receiving a storage size request from a client computing device;
- computing an ephemeral graph database storage size; and
- conveying the ephemeral graph database storage size to the client computing device, wherein the ephemeral graph database storage size of the ephemeral graph database is smaller than a relational database storage size of the relational database;

generating the ephemeral graph database, wherein the ephemeral graph database encodes the selected data in a graph structure;

storing the ephemeral graph database in binary large object (BLOB) storage at the one or more server memory devices;

receiving, via the database API, instructions to apply a graph analytics algorithm at the ephemeral graph database;

in response to receiving the instructions to apply the graph analytics algorithm, reading the ephemeral graph database from the BLOB storage;

applying the graph analytics algorithm to the ephemeral graph database to generate a graph analytics result;

outputting the graph analytics result; and deleting the ephemeral graph database from the BLOB storage.

10. The method of claim 9, wherein:
the ephemeral graph database request further includes an ephemeral graph database lifetime; and
the ephemeral graph database is deleted from the BLOB storage in response to determining that the ephemeral graph database lifetime has elapsed.

11. The method of claim 9, wherein the ephemeral graph database is deleted from the BLOB storage in response to outputting the graph analytics result.

12. The method of claim 9, wherein the ephemeral graph database includes:
as nodes of the graph structure, one or more first tables included in the relational database; and
as edges of the graph structure:
one or more second tables included in the relational database; and/or
one or more queries over the one or more second tables.

13. The method of claim 9, further comprising storing the graph analytics result in the relational database.

14. The method of claim 9, further comprising:
via the database API, receiving instructions to update, audit, evict, or extend the ephemeral graph database; and
updating, auditing, evicting, or extending the ephemeral graph database as indicated by the instructions.

15. The method of claim 9, further comprising:
generating ephemeral database log data that includes:
an ephemeral database creation record of generating the ephemeral graph database;
an analytics record of performing the graph analytics algorithm; and
an ephemeral database deletion record of deleting the ephemeral graph database from the BLOB storage; and storing the ephemeral database log data at one or more server memory devices.

16. The method of claim 9, wherein:
the relational database is stored in a relational database management system (RDBMS); and
the ephemeral graph database is not stored in the RDBMS.

17. A computing system comprising:
one or more memory devices storing a relational database in a relational database management system (RDBMS); and
one or more processing devices configured to:
receive an ephemeral graph database request, wherein the ephemeral graph database request indicates a selection of data stored in the relational database for inclusion in an ephemeral graph database;
prior to generating the ephemeral graph database:
receive a storage size request from a client computing device;
compute an ephemeral graph database storage size; and
convey the ephemeral graph database storage size to the client computing device, wherein the ephemeral graph database storage size of the ephemeral graph database is smaller than a relational database storage size of the relational database;
generate the ephemeral graph database, wherein the ephemeral graph database encodes the selected data in a graph structure;
store the ephemeral graph database in binary large object (BLOB) storage at the one or more memory devices without storing the ephemeral graph database in the RDBMS;
receive instructions to apply a graph analytics algorithm at the ephemeral graph database;
in response to receiving the instructions to apply the graph analytics algorithm, read the ephemeral graph database from the BLOB storage;
apply the graph analytics algorithm to the ephemeral graph database to generate a graph analytics result;
output the graph analytics result; and
delete the ephemeral graph database from the BLOB storage.

18. The computing system of claim 17, wherein:
the ephemeral graph database request further includes an ephemeral graph database lifetime; and
the one or more processing devices are further configured to delete the ephemeral graph database from the BLOB storage in response to determining that the ephemeral graph database lifetime has elapsed.

19. The computing system of claim 17, wherein the one or more processing devices are configured to delete the ephemeral graph database from the BLOB storage in response to outputting the graph analytics result.

20. The computing system of claim 17, wherein the one or more processing devices are further configured to:
receive instructions to update, audit, evict, or extend the ephemeral graph database; and
update, audit, evict, or extend the ephemeral graph database as indicated by the instructions.

* * * * *